United States Patent
Suzuki et al.

(10) Patent No.: US 10,428,227 B2
(45) Date of Patent: Oct. 1, 2019

(54) ANTISTATIC COMPOSITION FOR VEHICLE, VEHICLE, AND METHOD FOR MANUFACTURING VEHICLE

(71) Applicants: NIHON TOKUSHU TORYO CO., LTD, Tokyo (JP); TOYOTA JIDOSHA KABUSHIKI KAISHA, Toyota-shi (JP)

(72) Inventors: Hiroshi Suzuki, Hiratsuka (JP); Masanori Hiraki, Tokyo (JP); Tetsuya Otogawa, Tokyo (JP); Ayumi Watanabe, Toyota (JP)

(73) Assignees: Nihon Tokushu Toryo Co., Ltd., Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/919,967

(22) Filed: Mar. 13, 2018

(65) Prior Publication Data

US 2018/0265715 A1    Sep. 20, 2018

(30) Foreign Application Priority Data

Mar. 15, 2017 (JP) .................................. 2017-050304

(51) Int. Cl.
 *H01B 1/22* (2006.01)
 *C09D 5/24* (2006.01)
 *C08K 3/08* (2006.01)
 *C08K 3/36* (2006.01)
 *C09D 123/26* (2006.01)
 (Continued)

(52) U.S. Cl.
 CPC ................. *C09D 5/24* (2013.01); *C08K 3/08* (2013.01); *C08K 3/36* (2013.01); *C09D 7/61* (2018.01); *C09D 7/65* (2018.01); *C09D 123/26* (2013.01); *C09D 151/06* (2013.01); *H01B 1/22* (2013.01);
 (Continued)

(58) Field of Classification Search
 CPC .......... C09D 5/24; C09D 123/26; C08K 3/36; C08K 3/08; C08K 2201/001; C08K 2003/0862; H01B 1/22
 See application file for complete search history.

(56) References Cited

U.S. PATENT DOCUMENTS 5,096,761 A    3/1992  Roberts et al.
5,250,228 A *  10/1993 Baigrie .................... C08K 3/04
                                                      219/541
(Continued)

FOREIGN PATENT DOCUMENTS

CN    102775705 A  * 11/2012
JP    61-285272 A    12/1986
(Continued)

OTHER PUBLICATIONS

Communication dated Mar. 20, 2018 issued by the German Patent and Trade Mark Office in counterpart German Patent Application No. 102018105987.6.
(Continued)

*Primary Examiner* — Mark Kopec
*Assistant Examiner* — Jaison P Thomas
(74) *Attorney, Agent, or Firm* — Sughrue Mion, PLLC

(57) ABSTRACT

Provided is an antistatic composition for a vehicle, including a nickel powder and a polyolefin resin. The antistatic composition contains 2.5 to 15 vol. % of the nickel powder as a pigment volume concentration (vol. %).

5 Claims, 2 Drawing Sheets

(51) Int. Cl.
   *C09D 151/06*   (2006.01)
   *C09D 7/61*    (2018.01)
   *C09D 7/65*    (2018.01)
(52) U.S. Cl.
   CPC ........... *C08K 2003/0862* (2013.01); *C08K 2201/001* (2013.01)

(56) References Cited

U.S. PATENT DOCUMENTS

| | | | |
|---|---|---|---|
| 9,403,996 B2* | 8/2016 | Rueger | C09C 1/405 |
| 2006/0202172 A1* | 9/2006 | Herrmann | C09D 5/24 |
| | | | 252/500 |
| 2008/0128661 A1* | 6/2008 | Phillips | C08J 5/044 |
| | | | 252/502 |
| 2009/0130322 A1* | 5/2009 | Nagano | C08G 18/6204 |
| | | | 427/407.1 |
| 2011/0135936 A1* | 6/2011 | Katsuta | C09D 5/002 |
| | | | 428/423.1 |
| 2016/0280162 A1 | 9/2016 | Yamada et al. | |

FOREIGN PATENT DOCUMENTS

| | | | |
|---|---|---|---|
| JP | 61285272 A | * | 12/1986 |
| WO | 2008/130955 A1 | | 10/2008 |
| WO | 2015/064195 A1 | | 5/2015 |

OTHER PUBLICATIONS

Communication dated Mar. 5, 2019, issued by the Japanese Patent Office in corresponding Japanese Application No. 2017-050304.

* cited by examiner

ANTISTATIC COMPOSITION FOR VEHICLE, VEHICLE, AND METHOD FOR MANUFACTURING VEHICLE

CROSS REFERENCE TO RELATED APPLICATIONS

This application is based on and claims priority under 35 USC 119 from Japanese Patent Application No. 2017-050304 filed on Mar. 15, 2017.

TECHNICAL FIELD

The present invention relates to an antistatic composition for a vehicle, a vehicle, and a method for manufacturing a vehicle.

BACKGROUND ART

A vehicle such as an automobile is charged positively through traveling. Also, in general, air is charged positively and hence a repulsive force is generated between the positively charged vehicle and airflow. The airflow is separated from the vicinity of the outer surface of the vehicle by the repulsive force and thereby desired aerodynamic characteristics may not be achieved and consequently traveling performance or driving stability may be degraded.

Patent Document 1 (WO2015/064195) describes that, by attaching a conductive aluminum tape to a vehicle, the aforementioned repulsive force is lowered thanks to self-discharge of the conductive film and thereby the separation of the airflow from the vicinity of the outer surface of the vehicle can be suppressed.

SUMMARY OF THE INVENTION

Problems to be Solved by the Invention

However, the conductive aluminum tape described in Patent Document 1 has various problems, such as a problem that it is expensive as a material to be applied to an automobile, a problem that wastes such as a release paper are generated in an application line, a problem that a special skill is necessary for its applying worker at the time of its attachment, a problem that it takes time for its application, and a problem that there is a limitation in an application shape.

The present invention solves the above problems.

Namely, an object of the present invention is to provide an antistatic composition for a vehicle, a vehicle having a film composed of the antistatic composition for a vehicle, and a method for manufacturing the vehicle, which are inexpensive, which can be used as an antistatic technique for a vehicle, which do not generate wastes such as a release paper, which have small variance in application quality depending on application workers, which require short application time, and which allow the application shape to design more freely, compared with a prior art.

<1> According to an aspect of the invention, there is provided an antistatic composition for a vehicle. The antistatic composition includes a nickel powder and a polyolefin resin. The antistatic composition contains 2.5 to 15 vol. % of the nickel powder as a pigment volume concentration (vol. %).

<2> According to another aspect of the invention, there is provided a vehicle including a film composed of the antistatic composition for a vehicle according to <1>.

<3> According to another aspect of the invention, there is provided a method for manufacturing the vehicle according to <2>, including a step of forming a film composed of the antistatic composition for a vehicle by a hot-melt application method or a coating method.

Advantage of the Invention

According to the present invention, it is possible to provide an antistatic composition for a vehicle, a vehicle having a film composed of the antistatic composition for a vehicle, and a method for manufacturing the vehicle, which are inexpensive, which can be used as an antistatic technique for a vehicle, which do not generate wastes such as a release paper, which have small variance in application quality depending on application workers, which require short application time, and which allow the application shape to design more freely, compared with a prior art.

BRIEF DESCRIPTION OF THE DRAWINGS

Exemplary embodiment(s) of the present invention will be described in detail based on the following figures, wherein.

DETAILED DESCRIPTION

[Antistatic Composition for Vehicle]

Figure 1:
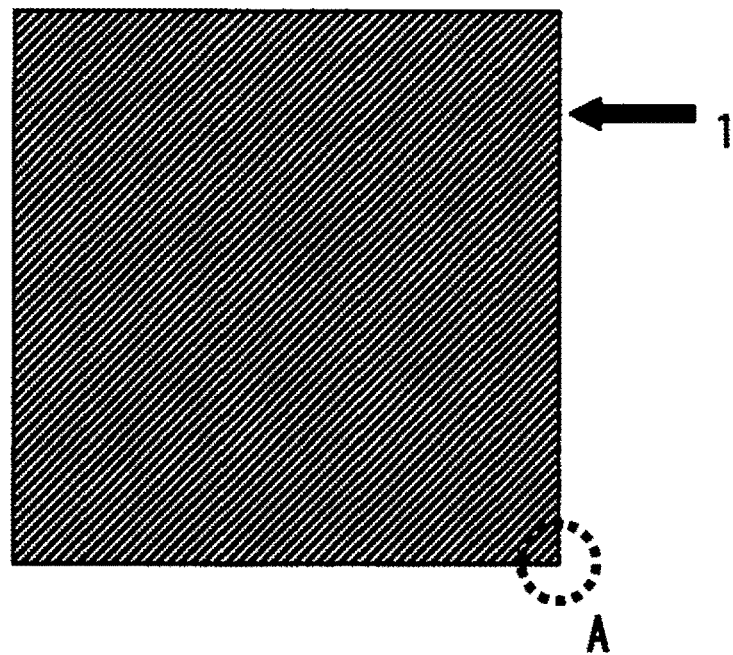
FIG. 1 is a schematic view illustrating an example of the shape of a film composed of an antistatic composition for a vehicle.

The antistatic composition for a vehicle of the present invention contains a nickel powder and a resin.

(Nickel Powder)

A nickel powder is preferable from the viewpoints of conductivity, cost performance, oxidation resistance, handling properties, and the like.

The shape of the nickel powder is not particularly limited but there may be mentioned a filamentous shape, a spike shape, a flake shape, a spherical shape, a needle shape, a corn shape, a dendritic shape, a scale-like shape, a particle shape, an irregular shape, a teardrop shape, and the like. From the viewpoint of obtaining higher antistatic properties, the nickel powder preferably has a filamentous shape.

The antistatic composition for a vehicle may further contain another conductive material in addition to the nickel powder.

The other conductive material is not particularly limited but there may be mentioned a metal powder such as a silver powder, a silver-coated metal powder, a copper powder, or an aluminum powder, a metal oxide such as zinc oxide, titanium oxide, tin oxide, indium oxide, antimony-doped tin oxide, phosphorus-doped tin oxide, or tin-doped indium oxide, or conductive carbon.

The content of the nickel powder in the antistatic composition for a vehicle of the embodiment is, as a pigment volume concentration, 2.5 to 15 vol. %, preferably 3.0 to 15 vol. %, more preferably 3.5 to 10.0 vol. %, in view of cost performance, further preferably 4.0 to 5.0 vol. %, particularly preferably 4.0 to 4.5 vol. %, and most preferably 4.5 vol. %.

When the content of the nickel powder in the antistatic composition for a vehicle of the embodiment is 4.5 vol. % or less as a pigment volume concentration, solid surface resistance value reaches $10^4\Omega$ or more and thus it is not necessary to consider an influence on the electric controlling system in an automobile, so that the case is preferred.

Incidentally, in the invention, the pigment volume concentration is defined in HS K5500 (2000). The pigment volume concentration of the nickel powder is a ratio of the total volume of the nickel powder in the volume of the whole nonvolatile matter in the coating.

(Resin)

The antistatic composition for a vehicle of the embodiment contains a polyolefin resin.

The polyolefin resin is not particularly limited but is preferably one suitable for components of a vehicle (steel plates, plastics, glass, etc.) to which the antistatic composition for a vehicle is applied.

For example, in the case where the antistatic composition for a vehicle is applied to a plastic component such as a bumper of an automobile, it is preferred to use a resin capable of being adhered to the plastic component (adherent). Particularly, in the case where the adherent is polypropylene that is hard to adhere, from the viewpoint of adhesiveness to polypropylene, the resin is preferably an acid-modified polyolefin or a chlorinated polyolefin.

In the case where an acid-modified polyolefin is used as the polyolefin resin, a film having antistatic properties can be formed by applying the antistatic composition for a vehicle to a vehicle by a hot-melt application method. That is, the antistatic composition for a vehicle can be used as a hot-melt composition (composition capable of forming a film on an adherent by a hot-melt application method). The hot-melt composition preferably does not contain any solvent. The form of the antistatic composition for a vehicle in the case of using it as a hot-melt composition is not particularly limited but there may be mentioned a stick form, a bead form, a pillow form, a block form, a pellet form, a sheet form, or the like.

As requirements for selecting a preferable acid-modified polyolefin, for example, the following (1) to (4) may be mentioned. Moreover, only one kind of the acid-modified polyolefin may be used or two or more kinds thereof may be mixed.

(1) The acid-modified polyolefin is capable of being adhered to polyolefin.

(2) A surface of the film formed by the acid-modified polyolefin has a tacking property in a level that a dust is not adhered to the film surface. (when a dust and the like are attached to the film surface, the antistatic effect may decrease) (For example, a level that a ball of ⅟32 inch is not adhered in a 30° inclination ball tacking test in accordance with JIS-Z0237 (2009) may be mentioned)

(3) The acid-modified polyolefin has a thermal stability such that oxidative degradation does not occur at 160° C.

(4) The acid-modified polyolefin has a viscosity in a level that the acid-modified polyolefin is dischargeable by a hot-melt gun.

The acid-modified polyolefin is not particularly limited but there may be mentioned compounds obtained by modifying polyolefin resins such as low density polyethylene, medium density polyethylene, high density polyethylene, straight-chain (linear) low density polyethylene, polypropylene, ethylene-propylene copolymers, methylpentene polymers, and polybutene polymers with acrylic acid, methacrylic acid, a methacrylic acid ester, maleic acid, maleic anhydride, fumaric acid, citraconic acid, citraconic anhydride, mesaconic acid, itaconic acid, itaconic anhydride, aconitic acid, aconitic anhydride, himic anhydride, or the like.

In the case where a chlorinated polyolefin is used as the polyolefin resin, since the chlorinated polyolefin can be dissolved or dispersed in a suitable solvent (organic solvent or water), the antistatic composition for a vehicle containing a solvent can be used as a coating (organic solvent-based coating or water-based coating). In this case, a film composed of the antistatic composition for a vehicle can be formed using a coating method.

The chlorinated polyolefin is not particularly limited but those obtained by chlorinating polyolefin resins such as crystalline polypropylene, amorphous polypropylene, ethylene-propylene copolymers, ethylene-propylene-diene copolymers, ethylene-propylene-α-olefin copolymers, and propylene-α-olefin copolymers. Furthermore, the chlorinated polyolefin may be an acid-modified chlorinated polyolefin in which an α,β-unsaturated carboxylic acid and/or a derivative thereof are introduced. As the α,β-unsaturated carboxylic acid and/or the derivative thereof, there may be mentioned acrylic acid, methacrylic acid, methacrylic acid esters, maleic acid, maleic anhydride, fumaric acid, citraconic acid, citraconic anhydride, mesaconic acid, itaconic acid, itaconic anhydride, aconitic acid, aconitic anhydride, himic anhydride, and the like. Moreover, the solvent may be appropriately selected depending on the resin to be used but there may be mentioned esters such as ethyl acetate, propyl acetate, and butyl acetate, aliphatic hydrocarbons such as methylcyclohexane and cyclohexane, ketones such as methyl ethyl ketone, alcohols such as methanol, ethanol, and isopropanol, aromatics such as toluene and xylene, water, and the like.

The hot-melt application method is a convenient application method, since a solvent is not used and drying can be performed at ordinary temperature. Therefore, for the reason that the hot-melt application method can be used, it is preferred to use the acid-modified polyolefin as the resin in the antistatic composition for a vehicle.

The content of the polyolefin resin in the antistatic composition for a vehicle of the embodiment is preferably 85.0 to 97.0 vol. %, more preferably 94.3 to 95.4 vol. %.

(Other Ingredients)

The antistatic composition for a vehicle of the embodiment may contain ingredients other than the above-described ones.

As the other ingredients, for example, an antisettling agent may be mentioned. As the antisettling agent, for example, silica powder or other thixotropic raw materials may be mentioned.

(Vehicle)

The present invention also relates to a vehicle having a film composed of the above-described antistatic composition for a vehicle.

As mentioned above, the film can be formed by imparting the antistatic composition for a vehicle to a partial component(s) of a vehicle by a hot-melt application method or a coating method. The film composed of the antistatic composition for a vehicle exhibits antistatic performance.

Figure 2:
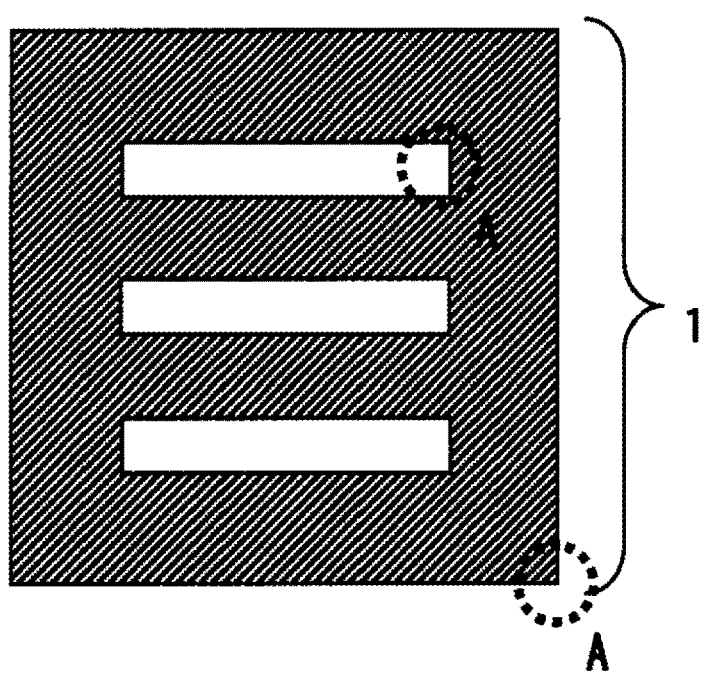
FIG. 2 is a schematic view illustrating an example of the shape of a film composed of an antistatic composition for a vehicle.
Figure 3:
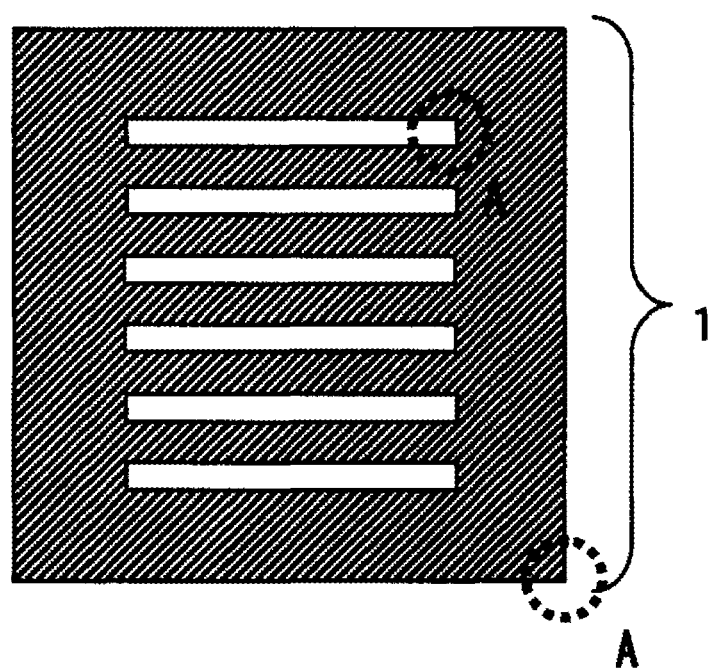
FIG. 3 is a schematic view illustrating an example of the shape of a film composed of an antistatic composition for a vehicle.

The shape of the film is not particularly limited but is preferably a shape having an edge part. This is because the positive charge generated on a vehicle is concentrated at the edge part of the film and the generated positive charge is released from the edge part at which corona discharge is prone to occur as compared with a planar shape, and thereby, the repulsion force acting between an outer surface of the vehicle and airflow is decreased and the separation of the airflow from the vicinity of the outer surface can be suppressed. For enhancing the antistatic properties, the film preferably has a larger number of the edge parts. FIGS. 1 to 3 show examples of Application Shapes of applied films. In FIGS. 1 to 3, a film composed of the antistatic composition for a vehicle of the embodiment is shown by Sign 1 (shaded portion) and the edge part is shown by A. FIG. 1 schematically shows a plan view of the film, and there are more edge parts in FIG. 2 than in FIG. 1 and there are much more edge parts in FIG. 3 than in FIG. 2.

The size of the film is not particularly limited but, for example, the length may be 0.5 to 40 cm and the width may be 0.5 to 10 cm.

The thickness of the film is not particularly limited but, for example, may be 10 to 300 μm.

In a vehicle, the position to which the film composed of the antistatic composition for a vehicle is applied is not particularly limited. In the case of application to an automobile, any components described in Patent Document 1 (WO2015/064195), for example, may be subjected to the application. As the components to which the film is applied, there may be, for example, mentioned a bumper (bumper cover), a door mirror, a head lamp, a door knob, a tail lamp, an antenna fin, a resin-made side door, a resin-made back door, a steering column cover, a window glass, an intake device, an exhaust device, and the like. The component is preferably a resin-made component having a large electrification amount generated by airflow, particularly preferably a bumper. Incidentally, the position to which the film composed of the antistatic composition for a vehicle is applied may be outer surfaces of these components or may be inner surfaces thereof.

[Method for Manufacturing Vehicle]

The present invention also relates to a method for manufacturing the vehicle, including a step of forming a film composed of the antistatic composition for a vehicle using a hot-melt application method or a coating method.

The hot-melt application method is not particularly limited and any known methods can be used. For example, there may be mentioned a method wherein a stick-shaped, bead-shaped, pillow-shaped, block-shaped, pellet-shaped, or sheet-shaped antistatic composition for a vehicle is heated, using a hot-melt gun (glue gun or the like), into a melted state, is discharged to be adhered to a vehicle and is allowed to stand at ordinary temperature, thereby cooling and solidifying the antistatic composition for a vehicle. The heating temperature can be appropriately selected depending on the resin to be used but, for example, may be 80 to 200° C.

The coating method is not particularly limited and any known methods can be used. For example, there may be mentioned spray coating, brush coating, bar coating, roller coating, and the like. In the case of using the coating method, the antistatic composition for a vehicle is preferably a coating solution containing a solvent.

EXAMPLES

The following will further specifically describe the present invention with reference to Examples. Needless to say, the invention should not be construed as being limited to the following Examples.

[Preparation of Antistatic Composition for Vehicle]

The raw materials shown in the following Table 1 were mixed in a mixing ratio shown in the following Table 1 to prepare each antistatic composition for a vehicle.

TABLE 1

| | Examples antistatic composition for vehicle | | | | | | | Conventional technique Conductive aluminum |
|---|---|---|---|---|---|---|---|---|
| Raw material | a1 | a2 | a3 | a4 | a5 | a6 | a7 | tape |
| Nickel powder | 19.7 wt % | 22.9 wt % | 25.8 wt % | 28.5 wt % | 31.1 wt % | 33.7 wt % | 51.7 wt % | — |
| Polyolefin resin | 79.3 wt % | 76.1 wt % | 73.2 wt % | 70.5 wt % | 67.9 wt % | 65.3 wt % | 47.3 wt % | — |
| Antisettling agent | 1.0 wt % | 1.0 wt % | 1.0 wt % | 1.0 wt % | 1.0 wt % | 1.0 wt % | 1.0 wt % | — |
| Total | 100 wt % | 100 wt % | 100 wt % | 100 wt % | 100 wt % | 100 wt % | 100 wt % | — |
| Nickel powder as pigment volume concentration | 2.5 vol. % | 3.0 vol. % | 3.5 vol. % | 4.0 vol. % | 4.5 vol. % | 5.0 vol. % | 10.0 vol. % | — |
| Solid surface resistance value | $1 \times 10^8 \, \Omega$ | $1 \times 10^6 \, \Omega$ | $4 \times 10^5 \, \Omega$ | $2 \times 10^5 \, \Omega$ | $2 \times 10^4 \, \Omega$ | $8 \times 10^3 \, \Omega$ | $2 \times 10^{-1} \, \Omega$ | — |
| Application method | Hot-melt application method | | | | | | | Attachment |

The following describes the raw materials.

Nickel powder: filamentous nickel powder
Polyolefin resin: acid-modified polyolefin resin
Antisettling agent: silica powder (Formation of Film by Hot-Melt Application Method)

Each of the antistatic compositions a1 to a7 for a vehicle was heated to 160° C. using a hot-melt gun, a glue gun, an oven heater, or the like and thereby the melted composition was discharged to a substrate. Thereafter, the composition was allowed to stand at ordinary temperature and thereby was cooled and solidified to form each film.

(Application by Attachment Method)

A conductive aluminum tape (AL-50BT manufactured by 3M Japan Limited) was peeled off from a release paper and attached on a substrate.

(Measurement of Solid Surface Resistance Value)

Solid surface resistance values of each film or tape were measured using a solid surface resistance value measuring device (Digital multimeter R6871E manufactured by ADVANTEST Corporation).

(Measurement of Residual Electrification Rate)

Using each of the antistatic compositions for a vehicle shown in Tables 2 to 4, the material of 3×3 cm was applied to a propylene-made substrate of 4×4 cm to form a film. The application shape of the film was a planar shape shown in FIG. 1 or a lattice shape shown in each of FIGS. 2 and 3 and the thickness of the film was 100 μm.

Using an electrified charge attenuation-measuring device (HONESTMETER H-0110-S4 manufactured by Shishido Electrostatic, Ltd.), the rate was measured by a method in accordance with JIS L 1094 (1997).

Measurement was performed at an applied voltage of 8 kV. The residual electrification rate was determined according to the following expression. One having a smaller value of the residual electrification rate has a high effect of releasing the charge and is excellent in antistatic properties.

Residual Electrification Rate (%)=100×(Voltage 2 minutes after application of the voltage is stopped)/(Voltage when the application of the voltage is stopped)

(Organoleptic Evaluation on Actual Vehicle Traveling Stability)

The antistatic composition for a vehicle was formed or the conductive aluminum tape was attached on a window glass at the driver seat or the front passenger seat of an automobile instead of the above polypropylene-made substrate, respectively in an area of 5×5 cm in the same manner as described above. A professional test driver drove each automobile at a test course in Higashi-Fuji Technical Center of Toyota Motor Corporation and organoleptic evaluation on traveling stability was performed.

The traveling stability performance of the automobile on which the conductive aluminum tape that is a conventional technique (Comparative Example 1) was applied in a shape of FIG. 2 (lattice shape) was taken as an organoleptic evaluation index of 100, which was regarded as a standard of the evaluation.

Excellent: traveling stability performance higher than the automobile on which the conductive aluminum tape was applied in a shape of FIG. 2 (lattice shape) (organoleptic evaluation index>100)

Good: performance equivalent to the automobile on which the conductive aluminum tape was applied in a shape of FIG. 2 (lattice shape) (organoleptic evaluation index=100)

Moderate: traveling stability performance lower than the automobile on which the conductive aluminum tape was applied in a shape of FIG. 2 (lattice shape) (organoleptic evaluation index<100)

The results are shown in Tables 2 to 4.

TABLE 2

Performance Comparison between Invention and Conventional Technique at Application Shape shown in FIG. 2 (lattice shape)

|  | Example 1 Antistatic composition for vehicle a5 | Comparative Example 1 Conventional technique Conductive aluminum tape |
|---|---|---|
| Application shape | FIG. 2 (lattice shape) | |
| Residual electrification rate (20° C., 50% RH) | 18% | 23% |
| Organoleptic evaluation on actual vehicle traveling stability | Excellent (organoleptic evaluation index 120) | Good (organoleptic evaluation index 100) |
| Application method | Hot-melt application method | Attachment |

From the results shown in Table 2, it was confirmed that Example 1 of the embodiment shows more excellent antistatic performance and actual vehicle traveling stability performance than those in Comparative Example 1 of a conventional technique.

TABLE 3

Performance Comparison among Various Materials at Application Shape shown in FIG. 1 (planar shape)

|  | Example 2 | Example 3 | Comparative Example 2 Conventional technique Conductive aluminum tape |
|---|---|---|---|
|  | Antistatic composition for vehicle | | |
|  | a5 | a7 | |
| Application shape | FIG. 1 (planar shape) | | |
| Residual electrification rate (20° C., 50% RH) | 32% | 15% | 82% |
| Organoleptic evaluation on actual vehicle traveling stability | Moderate (organoleptic evaluation index 90) | Excellent (organoleptic evaluation index 150) | Moderate (organoleptic evaluation index 60) |
| Application method | Hot-melt application method | | Attaching |

From the results shown in Table 3, as a result of the comparison between Example 2 and Example 3, it was confirmed that the antistatic performance and the actual vehicle traveling stability performance are improved by increasing the nickel powder as the pigment volume concentration. Furthermore, also in Shape FIG. 1 (planar shape), it was confirmed that Examples 2 and 3 of the embodiment show more excellent antistatic performance and actual vehicle traveling stability performance than those in Comparative Example 2 of a conventional technique.

TABLE 4

Performance Comparison among Individual Shapes

|  | Example 2 | Example 1 | Example 4 |
|---|---|---|---|
|  | Antistatic composition for vehicle | | |
|  | a5 | | |
| Application shape | FIG. 1 (planar shape) | FIG. 2 (lattice shape) | FIG. 3 (lattice shape) (more edges than in FIG. 2) |
| Residual electrification rate (20° C., 50% RH) | 32% | 18% | 15% |
| Organoleptic evaluation on actual vehicle traveling stability | Moderate (organoleptic evaluation index 90) | Excellent (organoleptic evaluation index 120) | Excellent (organoleptic evaluation index 150) |
| Application method | Hot-melt application method | | |

From the results shown in Table 4, it was confirmed that the traveling stability performance is improved by changing the application shape to an application shape having many edges.

The raw materials shown in the following Table 5 were mixed in a mixing ratio shown in the following Table 5 to prepare antistatic compositions b1 to b3 for a vehicle of Comparative Examples.

The raw materials, a method for forming a film, and an attachment method are the same as in Examples.

(Measurement of Residual Electrification Rate)

Using each of the antistatic compositions b1 to b3 for a vehicle of Comparative Examples, the material of 3×3 cm was applied to a propylene-made substrate of 4×4 cm to form each film. The shape of the film was a planar shape shown in Application Shape shown in FIG. 1 and the thickness of the film was 100 μm.

The residual electrification rate was determined by the same method as mentioned above.

TABLE 5

| Raw material | Comparative Examples antistatic composition for vehicle | | |
|---|---|---|---|
| | b1 | b2 | b3 |
| Nickel powder | 0 wt % | 8.8 wt % | 16 wt % |
| Polyolefin resin | 99.0 wt % | 90.2 wt % | 82.6 wt % |
| Antisettling agent | 1.0 wt % | 1.0 wt % | 1.0 wt % |
| Total | 100 wt % | 100 wt % | 100 wt % |
| Nickel powder as pigment volume concentration | 0 vol. % | 1.0 vol. % | 2.0 vol. % |
| Residual electrification rate (20° C., 50% RH) | 100% | 99% | 97% |

From the results shown in Table 3 and Table 5, it was confirmed that Examples 2 and 3 of the embodiment show more excellent antistatic performance than Comparative Examples b1 to b3.

The invention claimed is:

1. An antistatic composition for a vehicle, consisting of a nickel powder and a polyolefin resin, which contains 2.5 to 15 vol. % of the nickel powder as a pigment volume concentration (vol. %),
wherein the polyolefin is an acid-modified polyolefin or a chlorinated polyolefin.

2. A vehicle comprising a film composed of the antistatic composition for a vehicle according to claim 1.

3. A method for manufacturing the vehicle according to claim 2, comprising a step of forming a film composed of the antistatic composition for a vehicle by a hot-melt application method or a coating method.

4. An antistatic coating solution for a vehicle, consisting of a nickel powder, a polyolefin resin and a solvent, which contains 2.5 to 15 vol. % of the nickel powder as a pigment volume concentration (vol. %).

5. The antistatic coating solution for a vehicle according to claim 4, wherein the polyolefin is an acid-modified polyolefin or a chlorinated polyolefin.

* * * * *